United States Patent [19]
Walker

[11] Patent Number: 4,820,391
[45] Date of Patent: Apr. 11, 1989

[54] EXHAUST GAS CLEAN UP PROCESS

[75] Inventor: Richard J. Walker, McMurray, Pa.

[73] Assignee: The United States of America as represented by the United States Department of Energy, Washington, D.C.

[21] Appl. No.: 207,562

[22] Filed: Jun. 16, 1988

[51] Int. Cl.$^4$ .............................................. B01D 13/02
[52] U.S. Cl. .................................. 204/182.4; 423/235; 423/242; 423/243
[58] Field of Search ................... 423/235, 242 A, 243; 204/182.3, 182.4, 182.5, 149, 151, 152, 153, 301

[56] References Cited

U.S. PATENT DOCUMENTS

| | | | |
|---|---|---|---|
| 3,554,895 | 1/1971 | McRae et al. | 204/301 |
| 4,044,101 | 8/1977 | Hisamatsu et al. | 423/235 |
| 4,091,074 | 5/1978 | Gorai et al. | 423/235 |
| 4,107,015 | 8/1978 | Chlanda et al. | 204/180 P |
| 4,615,780 | 10/1986 | Walker | 204/182.4 |
| 4,629,545 | 12/1986 | Mani et al. | 204/182.4 |

OTHER PUBLICATIONS

Walker et al., Aqueous Absorbents and Membranes for a New Flue Gas SO$_2$ and NO$_x$ Removal Process Using Electrodialysis for Regeneration, Paper No. 128c, U.S. Doe, Pittsburgh, PA., Nov. 2, 1986.

Walker et al., Evaluation of Advanced Separation Techniques for Application to Flue Gas Cleanup Processes for the Simultaneous Removal of Sulfur Dioxide and Nitrogen Oxides, DOE/PETC/TR-85/7, Jun. 1985.

Primary Examiner—John F. Niebling
Assistant Examiner—David G. Ryser
Attorney, Agent, or Firm—Hugh W. Glenn; Paul A. Gottlieb; Judson R. Hightower

[57] ABSTRACT

A method of cleaning an exhaust gas containing particulates, SO$_2$ and NO$_x$ includes prescrubbing with water to remove HCl and most of the particulates, scrubbing with an aqueous absorbent containing a metal chelate and dissolved sulfite salt to remove NO$_x$ and SO$_2$, and regenerating the absorbent solution by controlled heating, electrodialysis and carbonate salt addition. The NO$_x$ is removed as N$_2$ or nitrogen-sulfonate ions and the oxides of sulfur are removed as a vaulable sulfate salt.

19 Claims, 4 Drawing Sheets

EXHAUST GAS CLEAN UP PROCESS

CONTRACTUAL ORIGIN OF THE INVENTION

The U.S. Government has rights in this invention pursuant to the employer/employee relationship of the inventor to the U.S. Department of Energy at the Pittsburgh Energy Technology Center.

BACKGROUND OF THE INVENTION

The invention relates to a method for the removal of particulates and for the simultaneous removal of $SO_2$ and $NO_x$ from exhaust or combustion gases.

Flue gas resulting from the combustion of carbonaceous material can contain hundreds to thousands parts per million (PPM) $SO_2$ and several hundred PPM of $NO_x$. The $NO_x$ generallyis in the form of NO.

In previous flue gas clean-up processes, sulfur dioxide was removed by wet-scrubbing. In one method, the flue gas was passed through an aqueous slurry of lime or limestone for reaction with $SO_2$ to form insoluble calcium sulfate and/or calcium sulfite. In a variation, known as the dual alkaline method, the flue gas passed through a scrubbing solution containing a sulfur dioxide absorbent such as sodium carbonate which reacted with $SO_2$ to form sodium bisulfite. The scrubber solution was regenerated by contact with a lime or limestone slurry where the sodium bisulfite reacted with calcium to form large quantities of insoluble hydrated calcium sulfite and calcium sulfate. The insoluble salts typically were sent to landfills for disposal. These processes used alone were not effective in removing oxides of nitrogen, particularly NO, from exhaust gases.

In one effort to simultaneously remove oxides of sulfur and oxides of nitrogen ($SO_x$ and $NO_x$) from exhaust gases, the gas was contacted with an aqueous absorbent containing a metal sulfite, ferrous ions and an aminopolycarboxylic acid. The aminopolycarboxylic acid removed the oxides of nitrogen and the oxides of sulfur were removed as dithionates ($M_2S_2O_6$) in a crystallization separation. Unfortunately, the dithionates are difficult and expensive to decompose.

In an earlier effort the present inventor found that the liquid absorbent for the oxides of sulfur could be regenerated in an electrodialysis process and the resulting sulfur-containing material removed as sulfuric acid (U.S. Pat. No. 4,615,780). Although this process is effective in the simultaneous removal of $SO_2$ and $NO_x$ from exhaust or combustion gases, various problems have arisen. The anion selective membranes used in the electrodialysis stack have been degraded by deposits of iron ethylene diamine tetraacetic acid (EDTA). The use of bipolar membranes for acid production prevented current reversal to remove the deposits. Also, the presence of acid exacerbated iron EDTA deposits and decreased current efficiency by hydronium ion permeation through anion selective membranes.

Therefore in view of the above, it is an object of the present invention to provide an improved process for the removal of oxides of sulfur and oxides of nitrogen from exhaust gases.

It is a further object to provide a process in which particular material can be removed along with the oxides of sulfur and oxides of nitrogen.

It is also an object to provide a regeneration method for an absorbent of $SO_2$ in which electrodialysis is conducted at near neutral pH values.

It is one other object of the present invention to provide an electrodialysis regeneration method with reduced membrane fouling in the electrodialysis compartments.

It is yet a further object to provide an improved electrodialysis regeneration process compatible with the use of metal chelates for the absorption of $NO_x$ gases.

SUMMARY OF THE INVENTION

In accordance with the present invention, a method of cleaning an exhaust gas containing particulates, $SO_2$ and $NO_x$ includes scrubbing the exhaust gas with an aqueous absorbent containing a sulfite and a metal chelate. The sulfite acts to take up $SO_2$ and water to form bisulfite. The metal chelate takes up $NO_x$ as the absorbent is loaded. The loaded absorbent is heated to at least 60° C. for at least four hours to regenerate the metal chelate. It is then passed through a first compartment of an electrodialysis stack from which sulfite and bisulfite ions are depleted. The first compartment is defined between a cation selective membrane disposed towards the cathode and an anion selective membrane disposed towards the anode in the electrodialysis stack. An aqueous solution is passed through a second compartment into which sulfite and bisulfite ions are concentrated. The second compartment is adjacent to the first compartment across the anion selective membrane and is defined between the anion selective membrane and a cation selective membrane disposed towards the anode. The electrical potential is established between the anode and the cathode to transfer sulfite and bisulfite from the first compartment into the second compartment. A carbonate salt is added to the aqueous absorbent to convert the bisulfite ions to sulfite and the aqueous absorbent is then returned into scrubbing contact with the exhaust gases for further clean-up use.

In other aspects of the invention, particulate material is removed from the exhaust gases prior to contact with the aqueous absorbent by scrubbing with water which also removes HCl. Additional particulates can be removed from the exhaust gas by turbulent contact with the aqueous absorbent.

In another important aspect of the invention, the spent aqueous absorbent is regenerated in respect to the metal chelate loaded with $NO_x$ values by heating with venting for at least four hours at a temperature of at least about 60° C. Sulfite and bisulfite ions are depleted from the aqueous absorbent in a first compartment in an electrodialysis cell having an anode and a cathode. The first compartment is defined between a first cation selective membrane disposed towards the cathode and an anion selective membrane disposed towards the anode. The sulfite and bisulfite ions are concentrated in an aqueous solution in a second compartment of the electrodialysis cell adjacent to the first compartment and across the anion selective membrane. The second compartment is defined between the anion selective membrane and a second cation selective membrane towards the anode. Following electrodialysis, a portion of the sulfite concentrate from the second compartment is oxidized to form sulfate and dried to form a solid sulfate salt for removal. A soluble carbonate is added to the spent aqueous absorbent to convert the bisulfite to sulfite ions, thereby regenerating the absorbent in respect to $SO_2$ absorption. The regenerated absorbent is returned into scrubbing contact with the exhaust gases to be cleaned.

In yet other aspects of the invention, the sulfite and bisulfite ions are in aqueous solution with cations selected from sodium, potassium or ammonium cations and the soluble carbonate salt added in regenerating the aqueous absorbent includes the corresponding cation.

In one other aspect of the invention, the polarity of the anode and cathode of the electrodialysis cell is periodically reversed and, consequently, the physical locations of the first and second compartments are exchanged to reverse the flow of sulfite and bisulfite ions through the common anion selective membrane. This reversal will typically be conducted every 5 to 100 minutes, preferably every 15 to 30 minutes. The residual aqueous absorbent containing the metal chelate remaining in the previously exchanged compartment is collected and returned into contact with the exhaust gases for use as a scrubbing agent.

In more specific aspects, solutions of sodium sulfite and sodium bisulfite are concentrated in the second compartment of the electrodialysis cell and sodium carbonate is added to regenerate the aqueous absorbent. Valuable sodium sulfate salt can be dried and withdrawn from the system for economic advantage.

In one other aspect of the invention, the metal chelate is preferably a ferrous salt of ethylenediaminetetraacetic acid (EDTA).

BRIEF DESCRIPTION OF THE DRAWINGS

The invention is illustrated in the accompanying drawings wherein.

DETAILED DESCRIPTION OF THE INVENTION

Figure 1:
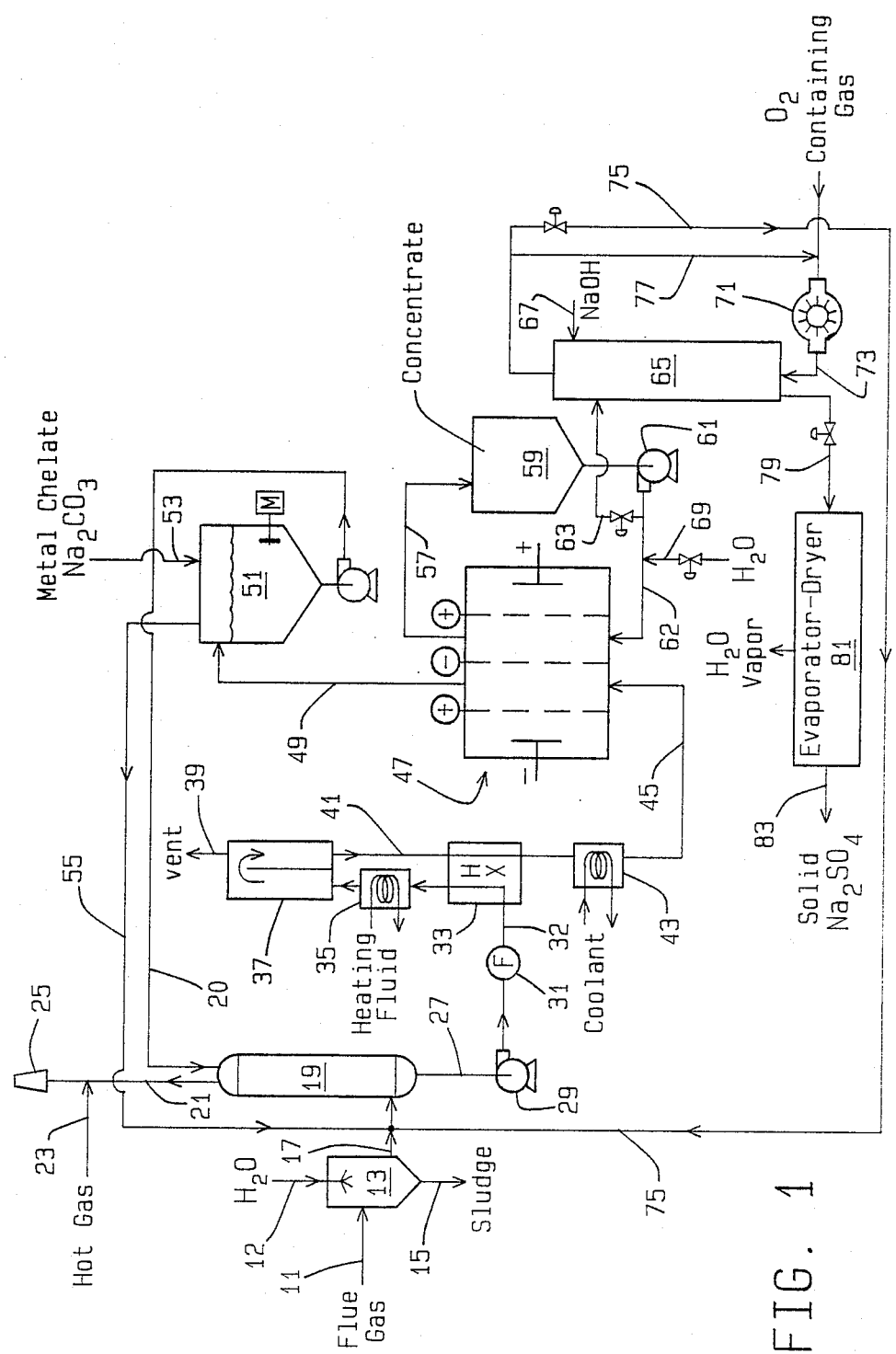
FIG. 1 is a schematic diagram of a method for removing oxides of sulfur and oxides of nitrogen along with particulate material from an exhaust gas with the continous regeneration of the liquid absorbent.

The invention is described with reference to FIGS. 1–4 of the drawings. In FIG. 1 an exhaust gas such as a combustion gas or other flue gas 11 is contacted with a water flow 12 within a prescrubber 13 to remove particulates and various acid gases such as HCl.

Prescrubber 13 can be a spray tower or venturi scrubber for particulate removal in the submicron and larger diameter ranges. The waste from prescrubber 13 can be discharged as a sludge 15 for drying or disposal in a pond. The volume of such sludge will be substantially smaller than that which would be required from a lime or limestone scrubber for the removal of sulfur containing gases from a combustion gas.

The partially cleaned discharged gas in conduit 17 is combined with other process gases and transmitted to the absorber-scrubber 19. In scrubber 19, the gases are contacted with an aqueous absorbent 20 containing a metal chelate for absorbing $NO_x$ and a buffer solution of sulfite and bisulfite salts for taking up $SO_2$ gas. The salts can be those of the alkali metals such as sodium, potassium or lithium, or of ammonium.

Preferably, sodium sulfite-bisulfite is selected based on its availability and the value of the sodium sulfate byproduct described below. Where ammonium salts are selected, a byproduct useful in fertilizers can be obtained, but ammonia and particulate ammonium sulfate may be released with the stack gases. Consequently, additional scrubbing stages ending with a water scrub may be required in the operation of absorber-scrubber 19 with an ammonium salt solution.

Where sodium salts are selected the following reactions can occur in absorber-scrubber 19.

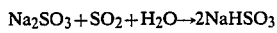

$$Na_2SO_3 + SO_2 + H_2O \rightarrow 2NaHSO_3$$

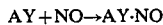

$$AY + NO \rightarrow AY \cdot NO$$

where A is a transition metal ion, preferably Fe(II) and Y is a chelating agent such as nitrilotriacetic acid (NTA), diethylenetriaminepentaacetic acid (DPTA), hydroxyethylethylenediaminetriacetic acid (HEDTA), hexamethylenetetramine (HMTA), and ethylenediaminetetraacetic acid (EDTA) (preferably EDTA or its salts).

Absorber-scrubber 19 is preferably a turbulent-contact-absorber (TCA) type or a catenary-grid type in order to remove any particulates in the 0.1 to 1.0 micron-diameter range that were not removed by prescrubber 13. The combination of a venturi prescrubber 13 and a TCA or catenary-grid absorber-scrubber 19 can advantageously be employed so that no other particulate removal device will be required in the process.

Absorber-scrubber 19 is operated with absorbent at a pH of 5–9, preferably about 6 to 8. If the pH is too high, hydroxide ion may reduce the efficiency of the electrodialysis stack and metal hydroxide precipitates may foul the electrodialysis membranes. Too acid a pH may reduce the efficiency of $SO_2$ and $NO_x$ removal.

The cleaned exhaust gas 21 discharged from scrubber 19 can be mixed with a hot gas 23, e.g. heated air or combustion products to improve the buoyancy of the plume prior to discharge through a stack 25.

The loaded absorbent 27 from scrubber 19 is propelled by pump 29 through a particulate filter 31. In most applications, filter 31 can be of small size requiring infrequent cleaning as most of the particulates are removed in the prescrubber 13.

The filtered absorbent liquid in conduit 32 passes through a regenerative heat exchanger 33 and a heater 35 prior to entering a reduction reactor 37 to begin the regeneration of the loaded metal chelate. Temperatures of at least about 60° C. to about 100° C., preferably 65°–75° C., can be used. A vent 39 releases gases such as $N_2$ that can be given off from reactor 37. The discharged absorbent liquid is cooled by passing through regenerative heat exchanger 33 and cooler 43 prior to entering the electrodialysis stack through conduit 45.

In reduction reactor 37, ferric ions or other plus three transition metal ions are reduced to the plus two (ferrous) state by reaction with sulfite and/or bisulfite to produce sulfate. Also the metal chelate loaded with NO is regenerated at the elevated temperatures. The mechanism of metal chelate regeneration is not clearly understood and the inventor does not wish to be limited to a particular reaction. However, it is suggested that the nitrogen may be reduced to $N_2$ gas or combined into a nitrogen-sulfur compound such as hydroxylamine disulfonate. Such nitrogen sulfur compounds along with side products such as dithionate are expected to transfer to the concentrate solution in the electrodialysis stack as will be described below.

Reduction reactor 37 preferably is of the plugflow type with minimal mixing of absorbent liquid with that flowing ahead or behind. An elongated tubular reactor or one having two or more tanks or tank sections in series can be provided for this purpose. This type of reactor assures sufficient residence time of 4 to 24 hours, preferably 10 to 12 hours for each segment of absorbent liquid without overtaking or recycling of liquid at different levels of ferric ion reduction or oxide of nitrogen conversion.

Within electrodialysis stack 47, sulfite and bisulfite ions balanced by appropriate cations are transfered from the liquid absorbent into an aqueous concentrate solution entering at 62. Liquid absorbent depleted in sulfite passes through conduit 49 into a mixing or make-up tank 51. Regeneration of the liquid absorbent is completed in mixing tank 51 by the addition of a carbonate salt 53 and any needed metal chelate. The resulting carbon dioxide gas is vented through conduit 55 and can be returned to scrubber-absorber 19. The concentrated ion solution 57 containing sulfite and bisulfite ions passes to a surge tank 59 from which it is circulated by pump 61 back to electrodialysis stack 47. The constant flow through the electrodialysis stack minimizes polarization next to the membranes.

A relatively small flow of concentrate is withdrawn through conduit 63 and treated in oxidizing reactor 65 with the addition of an alkali solution such as sodium hydroxide at 67. To offset the withdrawal of concentrate, make-up water can be added at 69 or into tank 69. Reactor 65 is provided with a circulating flow of oxygen-containing gas such as air propelled by blower 71 through conduit 73. A portion of this gas is vented or returned to absorber 19 through conduit 75 and the remainder is recirculated through conduit 77.

Within reactor 65 the following reactions can take place:

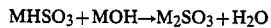

$$MHSO_3 + MOH \rightarrow M_2SO_3 + H_2O$$

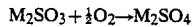

$$M_2SO_3 + \tfrac{1}{2}O_2 \rightarrow M_2SO_4$$

A catalyst such as vanadium pentoxide, ferric oxide or cupric oxide may be used advantageously in the latter reaction. In the above reactions, M represents an alkali metal such as sodium, potassium, lithium or it represents an ammonium cation. The sulfate produced is withdrawn through conduit 79 and passed to an evaporator-dryer 81 from which sulfate salt 83 such as sodium sulfate can be recovered for economic advantage.

Figure 2:
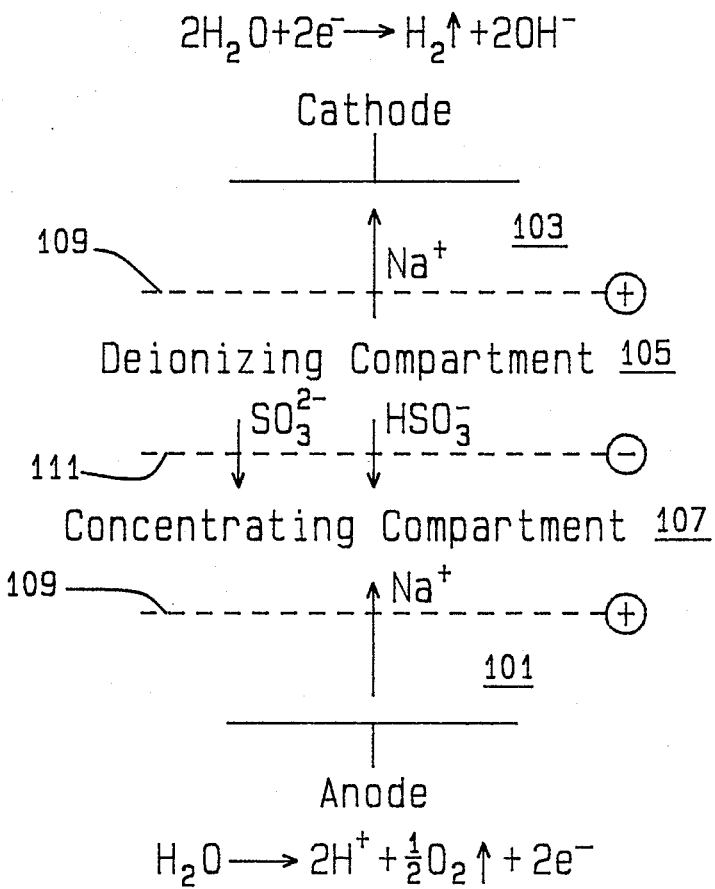
FIG. 2 is a schematic diagram of an electrodialysis stack used in the regeneration of a liquid absorbent.

FIG. 2 is a schematic illustration of one cell along with the anode and cathode of the electrodialysis stack 47. However, the inventor contemplates that a plurality of cells, e.g. 50-300 will be used in the electrodialysis stack. The stack includes an anode compartment 101 and a cathode compartment 103 at opposite ends separated by a plurality of deionizing compartments 105 and a plurality of concentrating compartments 107. The various compartments are separated by anion selective membranes 111 alternating with cation selective membranes 109 throughout the stack. Each deionizing compartment 105 is separated from an adjacent concentrating compartment 107 by an anion selectivive membrane 111. Cation selective membranes are disposed at either end of the stack separating the electrode compartments 103 and 101 from the adjacent deionizing and concentrating compartments 105 and 107 respectively. Each deionizing compartment 105 is defined by a cation selective membrane 109 disposed towards the cathode and an anion selective membrane 111 disposed towards the anode. Correspondingly, each concentrating compartment 107 is defined by a cation selective membrane 109 disposed towards the anode and by an anion selective membrane 111 disposed towards the cathode.

On imposing an electrical potential between the cathode and anode, sulfite and bisulfite ions migrate from the deionizing compartments 105 into the concentrating compartments 107 where they are balanced by a cation flow through the adjacent cation selective membrane 109. FIG. 2 illustrates the cations as sodium ions, but it should be clear that other alkali metal ions and ammonium ions can also be employed within the electrodialysis stack. Correspondingly, the electrolyte within the anode 101 and cathode 103 compartments advantageously can include a sulfate of the selected cation. It also should be clear that dithionate ions and nitrogen-sulfur ions such as hydroxylamine disulfonate will tranfer into the concentrate.

Figure 3:
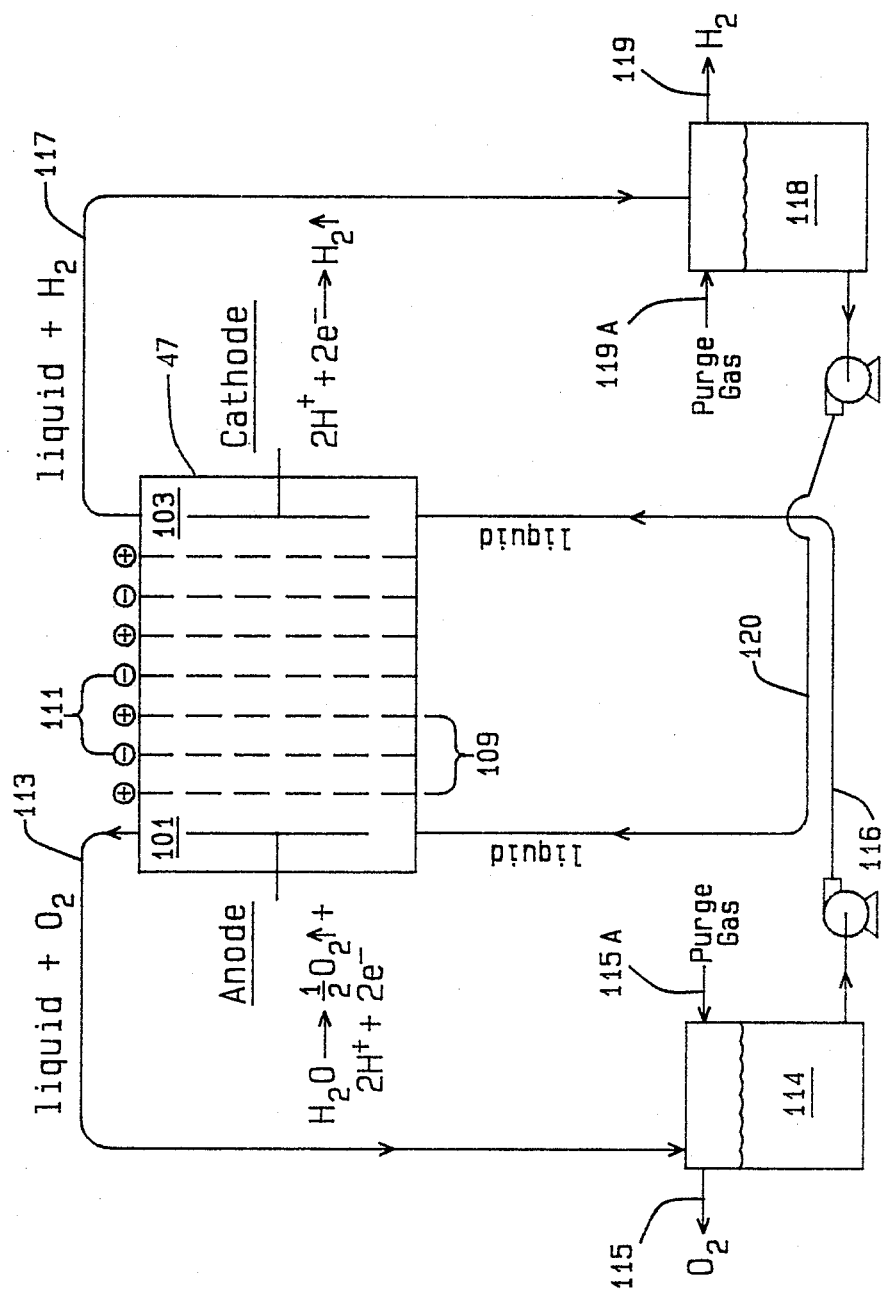
FIG. 3 is a schematic diagram illustrating other aspects in operating the electrodialysis stack of FIGS. 1 and 2.

In carrying out the process of the present invention, a small amount of water is electrolytically decomposed to give off hydrogen gas at the cathode and oxygen gas at the anode. This can produce a small amount of hydronium ions in the anode compartment and hydroxide ions in the cathode compartment. In order to maintain constant pH and cation (sodium) concentrations, the anode and cathode electrolyte solutions can be circulated as illustrated in FIG. 3. This advantageous process arrangement also permits separate removal of the hydrogen and oxygen gases produced at the electrodes.

FIG. 3 illustrates electrodialysis stack 47 including a plurality of cation selective 109 and anion selective 111 membranes between anode compartment 101 and cathode compartment 103. Electrolyte, for example, a sodium sulfate or other sulfate solution, along with entrained oxygen gas is withdrawn from anode compartment 101 through conduit 113 and passed into separator tank 114. The oxygen gas is vented at 115 from the head space of tank 114 and can be purged if warranged by a diluent or purge gas 115A, such as air or nitrogen.

The electrolyte is circulated through conduit 116 to cathode compartment 103 from which it is withdrawn with entrained hydrogen gas through line 117 to separator tank 118. The hydrogen gas is vented at 119 with optional purge gas at 119A and the electrolyte solution is returned to anode compartment 101 through conduit 120. The circulation of electrolyte between the electrodes as shown permits reduction of hydronium ions at the cathode (or oxidation of hydroxide ions at the anode) with reduced electrical loss compared to the electrolysis of water at both electrodes. The system of FIG. 3 also permits the separate and safe removal of hydrogen and oxygen gases while maintaining the electrolyte in the electrode compartments at near neutral pH.

It is of considerable importance that the pH of the absorbent in the deionizing compartments and that of the solution in the concentrating compartments be maintained near neutral. Too high a pH can result in the precipitation of metal hydroxides and fouling of the electrodialysis membranes. Too low a pH may result in hydronium ions permeating through the anion selective membranes to decrease the effectiveness of sulfite removal. Also, low pH absorbent returning to absorber-scrubber 19 can adversely affect $SO_2$ and $NO_x$ removal.

In one manner of carrying out the present invention, the polarity of the cathode and anode are periodically reversed during the course of the process. Such reversal in polarity will clean and extend the life of the anion selective membranes throughout the electrodialysis stack. In addition, the reversal of polarity will exchange the location of the concentrating and deionizing compartments in the stack. This exchange requires valving the absorbent solution in conduit 45 into the new deionizing compartments and valving the concentrate solution in conduit 62 into the new concentrate compartments.

Figure 4:
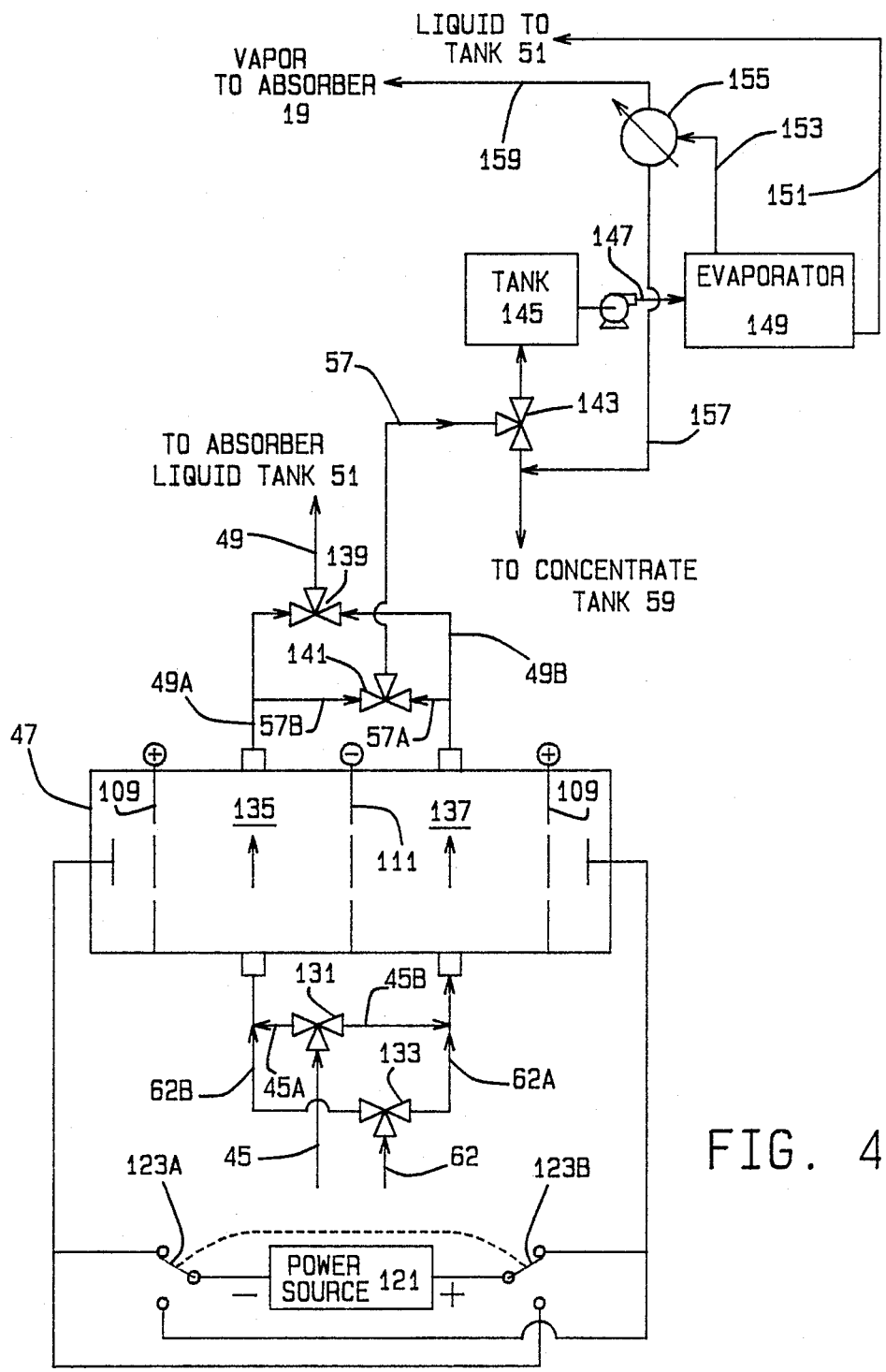
FIG. 4 is a schematic diagram of one manner of connecting the electrodialysis stack of FIGS. 1 and 2.

In FIG. 4, a suitable valving and switching arrangement is illustrated for reversing the polarity of the electrodialysis stack 47. Electrical power source 121 is provided with suitable switching gear such as mechanically linked switches 123A and 123B for reversing the connections to the electrodialysis stack. Typically, a double pole, double throw switch is suitable for this purpose.

Loaded absorbent entering in conduit 45 can be valved through three-way valve 131 to either compartment 135 via line 45A or to compartment 137 through conduit 45B. In either event, the compartment receiving the loaded absorbent liquid becomes a deionizing compartment from which ions are depleted through anion exchange membrane 111 into the adjacent concentrating compartment. Correspondingly, aqueous concentrate solution entering in conduit 62 can be routed by valve 133 through either conduit 62A or 62B into the compartment, 137 or 135, not accepting the absorbent solution. When absorbent solution enters compartment 135 through conduit 45A, concentration solution enters compartment 137 through conduit 62A. On reversal of polarity in the power source 121, three-way valves 131 and 133 are reversed to change compartment 135 from a deionizing compartment to a concentrating compartment and to change compartment 137 from a concentrating to a deionizing compartment. Correspondingly, the three-way valves 139 and 141 are approriately positioned to discharge the absorbent solution through conduit 49 and concentrate solution through conduit 57.

Immediately after reversing the polarity and the valving in the system, absorbent solution containing valuable metal chelates will remain in the compartments and conduits newly switched to concentrate solution. A three-way valve 143 is illustrated in conduit 57 for diverting the residual absorbent liquid into surge tank 145 for a short time. Typically, only one-half percent to ten percent of the concentrate flow is diverted. The residual absorbent liquid is pumped through conduit 147 to evaporator 149 where it is concentrated and passed through conduit 151 to make-up tank 51. Vapor removed through conduit 153 is partially condensed in condenser 155 with condensate returned via conduit 157 to concentrate tank 59. The noncondensed vapors are returned to the flue gas feed of absorber-scrubber 19 through conduit 159. Through use of this diverted flow, most of the metal chelate absorbent can be recovered and returned to make-up tank 51.

In make-up tank 51 additional metal chelate can be added if needed. In addition, a carbonate of the selected cation ($Na^+$, $K^+$, $Li^+$ or $NH_4^+$) is addedto regenerate bisulfite ions to sulfite ions. Where sodium ions are used the following reactions can occur in make-up tank 51.

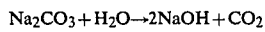

$$Na_2CO_3 + H_2O \rightarrow 2NaOH + CO_2$$

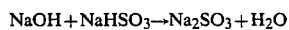

$$NaOH + NaHSO_3 \rightarrow Na_2SO_3 + H_2O$$

As discussed above, the $CO_2$ can be vented to the flue gas feed of absorber-scrubber 19 and discharged through stack 25.

The following Example is presented merely by way of illustration and not to further limit the invention as defined in the claims.

EXAMPLE

Flue gas, from a coal combustor, containing ash particles, about 300 ppm NO and about 1000 ppm $SO_2$ passes through a venturi scrubber where most submicron and larger particles are removed and discharged in an aqueous sludge. The gas, cooled to about 50° C., enters a turbulent-contact-absorber having fluidized packing of about 4 centimeters diameter to induce localized turbulent flow conditions and remove any remaining particulates from the gas. An aqueous absorbent liquid containing about 0.4 molar sodium sulfite-sodium bisulfite at a pH of about 7, about 0.1 molar ferrous EDTA at a temperature of about 50° C. contacts the gas to remove more than about 90% of the $SO_2$ and NO pollutants. The cleaned gas is mixed with hot air at about 195° C. and discharged from a high stack.

The loaded absorbent liquid is heated to about 70° C. and passed to two interconnected elongated vessels which act as a plug-flow type of reactor for the reduction of any ferric ions to ferrous ions with bisulfite reducing agent. The reactor volume is sufficient to attain a residence time of about 10 hours. The absorbent liquid then is cooled to about 50° C. and passed through the deionizing compartments of an electrodialysis stack containing about 200 cells in series between a single cathode and anode. Both the anode and cathode are washed with a circulating flow of about 0.6 molar $Na_2SO_4$. An electrical potential of about 135 volts is used to transfer about 20% of the sulfite-bisulfite ions from the absorbent into the concentrate flow through the electrodialysis stack.

The deionized absorbent having slightly reduced pH due to increased bisulfite concentration is treated with sufficient sodium carbonate to return the pH to about 7 and with added ferrous salt of EDTA to return its concentration to about 0.1 molar for reuse as absorbent liquid.

The concentrate from the electrodialysis stack is recirculated with about 2% of the flow withdrawn for oxidation of the sulfite to sulfate and removal by drying to solid sodium sulfate.

It is seen that the present invention provides a process for the simultaneous removal of $SO_2$ and $NO_x$ from exhaust and flue gas streams. Particulates are likewise removed in a sludge and filter solids. The absorbent is regenerated by an electrodialysis technique to provide a valuable sulfate salt as a by-product. Near neutral pH values increase the effectiveness and extend the life of the ion selective membranes in the electrodialysis stack. Valuable metal chelates employed in $NO_x$ removal are regenerated and recycled to minimize any required make-up.

Although the present invention is described in terms of specific materials, embodiments and process steps, it will be clear to one skilled in the art that various modifications can be made within the scope of the invention as defined in the accompanying claims.

The embodiments of the invention in which an exclusive property or privilege is claimed are defined as follows:

1. A method of regenerating a spent absorbent used in removing $NO_x$ and $SO_2$ from exhaust gases, said absorbent including sulfite and bisulfite ions and a metal chelate at least partially loaded with $NO_x$ values, said method comprising:
heating and venting the loaded absorbent for at least 4 hours at a temperature of at least 60° C. to regenerate the metal chelate in respect to $NO_x$ absorption;
depleting sulfite and bisulfite ions from said absorbent in a first compartment of an electrodialysis cell having an anode and cathode, said first compartment defined between a first cation selective membrane disposed towards the cathode and an anion selective membrane disposed toward the anode;
concentrating sulfite and bisulfite ions in an aqueous solution in a second compartment adjacent to said first compartment across said anion selective membrane in the electrodialysis cell, said second compartment defined between said anion selective membrane and a second cation selective membrane towards said anode;
oxidizing a portion of the sulfite concentrated in the second compartment to form a sulfate salt and drying the sulfate salt to a solid for withdrawal;
adding a soluble carbonate to the spent absorbent to convert bisulfite to sulfite ions and thereby regenerate the absorbent in respect to $SO_2$ absorption;
returning the regenerated absorbent into contact with said exhaust gases.

2. The method of claim 1 wherein said sulfite and bisulfite ions are in aqueous solution with cations selected from the group consisting of alkali metal cations and ammonium cations and wherein said soluble carbonate is selected from the group consisting of alkali metal carbonates and ammonium carbonate.

3. The method of claim 1 wherein said loaded absorbent is heated to a temperature of 60°–100° C. and held at this temperature for 4–24 hours with venting to regenerate the metal chelate for $NO_x$ absorption.

4. The method of claim 1 wherein the polarity of the anode and cathode of said electrodialysis cell is periodically reversed and consequently the location of said first and second compartments exchanged to reverse the flow of sulfite and bisulfite ions through the anion selective membrane.

5. The method of claim 4 wherein residual absorbent containing metal chelate following polarity and compartment reversal is collected and returned into contact with the exhaust gases.

6. The method of claim 1 wherein the polarity of the electrodialysis cell is reversed about every 5–100 minutes.

7. The method of claim 1 wherein aqueous solutions of sodium sulfite and sodium bisulfite are concentrated in the second compartment of the electrodialysis cell.

8. The method of claim 1 wherein the concentrated aqueous solution of sulfite and bisulfite ions is treated with alkali to convert bisulfite to sulfite, oxidized to form sulfate and evaporated to dryness for withdrawal of a sulfate salt.

9. The method of claim 1 wherein said metal chelate is a ferrous salt of ethylenediaminetetraacetic acid (EDTA).

10. The method of claim 1 wherein a flow of aqueous metal sulfate solution is circulated between the cathode and the anode of the electrodialysis stack with hydrogen gas generated at said cathode and oxygen gas generated at said anode, said method further including the steps of venting hydrogen gas from said solution prior to contact with said anode and venting oxygen gas from said solution prior to contact with said cathode.

11. A method of cleaning an exhaust gas containing $SO_x$ and $NO_x$ comprising:
scrubbing said exhaust gas with an aqueous absorbent containing a sulfite and a metal chelate, said sulfite acting to take up $SO_2$ and water to form bisulfite and said metal chelate acting to take up $NO_x$ as the absorbent is loaded,
heating the loaded absorbent to at least 60° C. for at least 4 hours to regenerate the metal chelate,
passing the aqueous absorbent through a first compartment from which ions are depleted in an electrodialysis stack having a cathode and an anode, said first compartment defined between a cation selective membrane disposed towards the cathode and an anion selective membrane disposed toward the anode,
passing an aqueous solution through a second compartment into which ions are concentrated in said electrodialysis stack adjacent to said first compartment across said anion selective membrane, said second compartment defined between said anion selective membrane and a second cation selective membrane towards said anode,
passing an electrical current between said anode and cathode to transfer sulfite and bisulfite from the first compartment into the second compartment,
adding carbonate to said absorbent to convert bisulfite to sulfite and
returning the aqueous absorbent into scrubbing contact with said exhaust gases.

12. The method of claim 11 wherein said exhaust gas includes particulates and prior to contact with said aqueous absorbent said exchaust gas is contacted in a scrubber with water for removal of particulates and HCl.

13. The method of claim 11 wherein said exhaust gas is contacted with said aqueous absorbent in turbulent flow to remove any residual particulates.

14. The method of claim 11 wherein the pH of said aqueous absorbent in scrubbing contact with said exhaust gas is between 5–9.

15. The method of claim 11 wherein said aqueous solution into which sulfite and bisulfite ions are concentrated is recirculated through said second compartment and wherein a portion of said concentrated solution is withdrawn, treated with alkali solution to convert bisulfite to sulfite, oxidized to convert sulfite to sulfate, evaporated and dried to recover a solid sulfate salt.

16. The method of claim 15 wherein sodium sulfite and bisulfite concentrate solution is processed to recover a solid sodium sulfate salt.

17. The method of claim 11 wherein a solution of sulfate salt is continuously circulated in contact with the anode and the cathode of said electrodialysis cell with hydrogen gas vented from said circulating solution prior to contact with the anode and oxygen gas vented from said circulating solution prior to contact with the cathode.

18. The method of claim 11 wherein the polarity of the electrodes and the locations of the first and second compartments in said electrodialysis stack are reversed about every 5–100 minutes to reverse the flow of current and ions through the membranes in said electrodialysis stack.

19. The method of claim 11 wherein the aqueous absorbent passing through said first compartment and the aqueous solution passing through said second compartment are at about neutral pH.

* * * * *